United States Patent
Ryu et al.

(10) Patent No.: US 12,407,607 B2
(45) Date of Patent: Sep. 2, 2025

(54) METHOD AND DEVICE FOR PERFORMING COMMUNICATION IN SOFTWARE DEFINED NETWORK SYSTEM

(71) Applicant: SAMSUNG ELECTRONICS CO., LTD., Suwon-si (KR)

(72) Inventors: Seungho Ryu, Suwon-si (KR); Jaegon Kim, Suwon-si (KR); Taewoo Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 386 days.

(21) Appl. No.: 17/966,415

(22) Filed: Oct. 14, 2022

(65) Prior Publication Data

US 2023/0031131 A1 Feb. 2, 2023

Related U.S. Application Data

(63) Continuation of application No. PCT/KR2021/004641, filed on Apr. 13, 2021.

(30) Foreign Application Priority Data

Apr. 17, 2020 (KR) .................. 10-2020-0046959

(51) Int. Cl.
*H04L 45/64* (2022.01)
*H04L 45/00* (2022.01)
(Continued)

(52) U.S. Cl.
CPC ............ *H04L 45/566* (2013.01); *H04L 45/38* (2013.01); *H04L 45/645* (2022.05);
(Continued)

(58) Field of Classification Search
CPC ..... H04L 45/38; H04L 45/645; H04L 45/566; H04L 45/745; H04L 69/22
See application file for complete search history.

(56) References Cited

U.S. PATENT DOCUMENTS 9,325,615 B2 4/2016 Wu
10,355,989 B1 7/2019 Panchal et al.
(Continued)

FOREIGN PATENT DOCUMENTS

| KR | 10-0699470 | 3/2007 |
| KR | 10-1491699 | 2/2015 |
| KR | 10-1740456 | 5/2017 |

OTHER PUBLICATIONS

International Search Report.
Korean Notice of the Reasons for Rejection dated Jul. 1, 2025 for KR Application No.

*Primary Examiner* — Brenda H Pham
(74) *Attorney, Agent, or Firm* — Nixon & Vanderhye P.C.

(57) ABSTRACT

The present disclosure relates to a communication method and system for converging a $5^{th}$-Generation (5G) communication system for supporting higher data rates beyond a $4^{th}$-Generation (4G) system with a technology for Internet of Things (IoT). The present disclosure may be applied to intelligent services based on the 5G communication technology and the IoT-related technology, such as smart home, smart building, smart city, smart car, connected car, health care, digital education, smart retail, security and safety services. According to the present disclosure, communication is performed more efficiently in a software defined network (SDN) environment.

8 Claims, 12 Drawing Sheets

(51) Int. Cl.
*H04L 45/645* (2022.01)
*H04L 45/745* (2022.01)
*H04L 47/10* (2022.01)
*H04L 69/22* (2022.01)

(52) U.S. Cl.
CPC ............ *H04L 45/745* (2013.01); *H04L 47/10* (2013.01); *H04L 69/22* (2013.01)

(56) References Cited

U.S. PATENT DOCUMENTS

| | | | |
|---|---|---|---|
| 2012/0099591 A1* | 4/2012 | Kotha | H04L 41/0894 370/392 |
| 2013/0010600 A1* | 1/2013 | Jocha | H04L 43/04 370/236.2 |
| 2014/0146817 A1 | 5/2014 | Zhang | |
| 2017/0070908 A1 | 3/2017 | Ogura | |
| 2017/0324582 A1 | 11/2017 | Yang et al. | |
| 2018/0219773 A1 | 8/2018 | Li | |
| 2019/0121960 A1 | 4/2019 | Brown et al. | |
| 2019/0394067 A1 | 12/2019 | Yu | |

* cited by examiner

METHOD AND DEVICE FOR PERFORMING COMMUNICATION IN SOFTWARE DEFINED NETWORK SYSTEM

CROSS-REFERENCE TO RELATED APPLICATIONS

This application is a continuation of International Application No. PCT/KR2021/004641 designating the United States, filed on Apr. 13, 2021, in the Korean Intellectual Property Receiving Office and claiming priority to Korean Patent Application No. 10-2020-0046959, filed on Apr. 17, 2020, in the Korean Intellectual Property Office, the disclosures of which are incorporated by reference herein in their entireties.

BACKGROUND

Field

The disclosure relates to a software defined network (SDN) system, and for example, to an SDN system in which components may be changed to perform communication more efficiently.

Description of Related Art

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mmWave) bands (e.g., 60 GHz bands), so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, MTC, and M2M communication may be implemented by beamforming, MIMO, and array antennas. Application of a cloud Radio Access Network (RAN) as the above-described Big Data processing technology may also be considered to be as an example of convergence between the 5G technology and the IoT technology.

On the other hand, the need for a method for more efficiently performing communication in the SDN environment has emerged.

SUMMARY

Embodiments of the disclosure provide a method and a device for configuring a network using various switches in a software defined network (SDN) environment.

According to an example embodiment of the disclosure, a communication method of a network device in a wireless communication system may comprise: adding a header to a data packet received from a first device based on a specified flow rule; transmitting the data packet to which the header is added to a first switch; removing, based on destination information of the data packet being confirmed by the first switch, the header; and transmitting the data packet from which the header is removed to a second device.

According to an example embodiment of the disclosure, a network device in a wireless communication system may comprise: a node comprising circuitry configured to: add a header to data packet received from a first device based on a specified flow rule and transmit the data packet to which the header is added; and a first switch configured to: receive the data packet to which the header is added, identify destination information of the data packet, remove the header based on a result of the identification, and transmit the data packet from which the header is removed to a second device.

According to various example embodiments of the disclosure, communication can be performed more efficiently by configuring a network using various switches in the SDN environment.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

Figure 1:
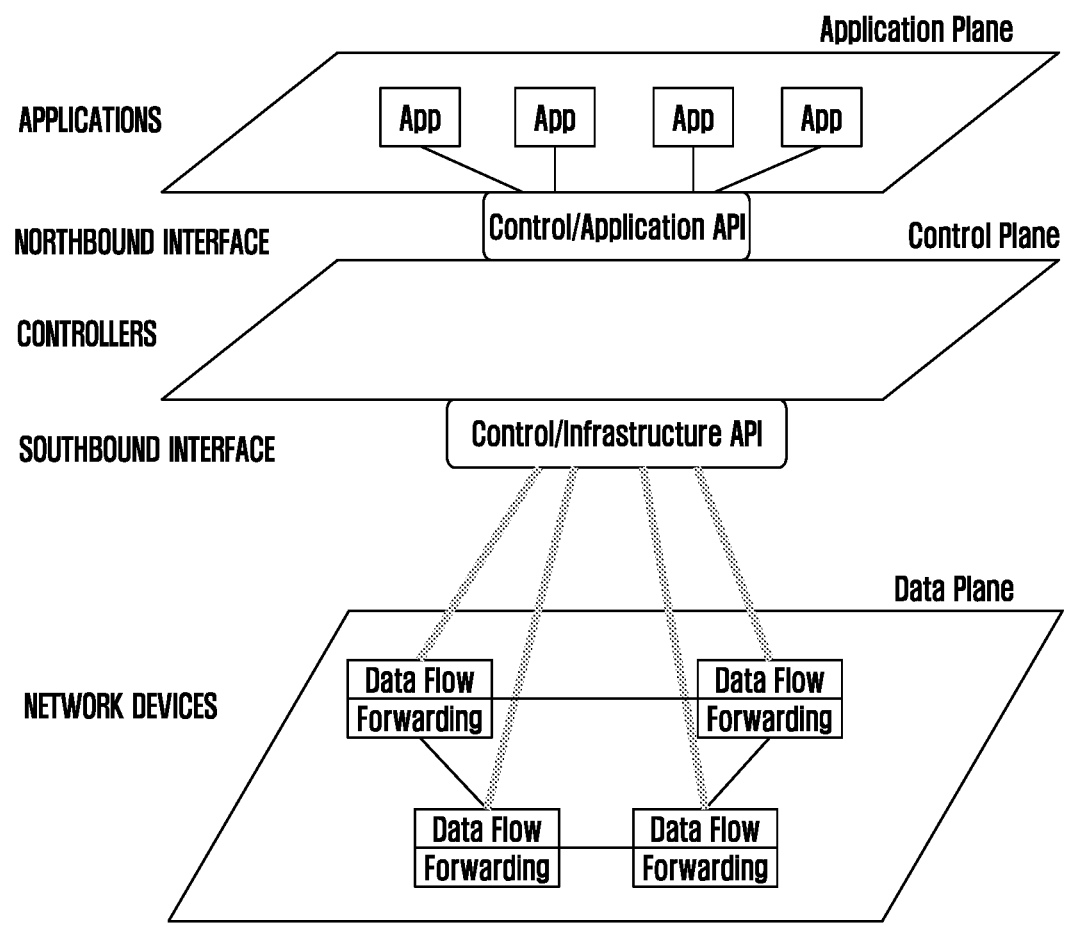
FIG. 1 is a diagram illustrating a general OpenFlow based an SDN configuration method.

Hereinafter, various example embodiments of the disclosure will be described in greater detail with reference to the accompanying drawings. It should be noted that the same components in the accompanying drawings are represented by the same symbol where possible. In addition, detailed descriptions of well-known functions and configurations that may obscure the gist of the present disclosure may be omitted.

Furthermore, in describing the embodiments of the disclosure, an Advanced E-UTRA (or referred to as LTE-A) system that supports carrier aggregation will be referred to as a non-limiting example to aid in understanding the disclosure, but it will be understood that the disclosure may be applied with some modifications to other communication systems with similar technical backgrounds and channel forms without significantly departing from the scope of the disclosure. For example, the disclosure may be applied to a multicarrier HSPA supporting carrier coupling.

In describing various example embodiments, a description of the technical content well known in the technical field to which the disclosure belongs and not directly related to the disclosure may be omitted.

Some components in the accompanying drawings are exaggerated, omitted, or outlined. In addition, the size of each component does not fully reflect the actual size. The same reference number may be assigned to the same or corresponding components in each drawing.

Advantages and features of the disclosure and methods for achieving them will become apparent with reference to the embodiments described below in detail together with the accompanying drawings. However, the disclosure is not limited to the embodiments disclosed below, and may be implemented in various different forms.

It will be understood that each block of processing flow chart drawings and combinations of flowchart drawings may be performed by computer program instructions. Since these computer program instructions may be mounted on processors of general-purpose computers, special computers, or other programmable data processing equipment, the instructions performed through the processors of the computer or other programmable data processing equipment generate a means to perform the functions described in the flow block (s). These computer program instructions may also be stored in computer-enabled or computer-readable memory that may be oriented toward computers or other programmable data processing equipment to implement functions in a certain way, so instructions stored in the computer-enabled or computer-readable memory may also produce manufactured items containing instruction means that perform the functions described in the flowchart block(s).

Since computer program instructions may be mounted on a computer or other programmable data processing equipment, instructions for performing a computer or other programmable data processing equipment by performing a series of operational steps on a computer or other programmable data processing equipment to generate a computer-executed process may also provide steps to execute the functions described in the flow block(s).

In addition, each block may represent a module, segment, or portion of code comprising one or more executable instructions for executing a specific logical function(s). It should also be noted that it is also possible for the functions mentioned in the blocks to occur out of order in some alternative embodiment. For example, it is possible that two blocks illustrated in succession are actually performed substantially simultaneously, or it is possible that the blocks are sometimes performed in the reverse order according to the corresponding function. In this case, the term 'unit' used in this embodiment may refer, for example, to software or hardware components such as FPGA or ASIC, and '~unit' performs certain roles. However, '~unit' is not limited to software or hardware. The '~unit' may be configured to be on an addressable storage medium or may be configured to play one or more processors. Thus, as an example, '~unit' comprises components such as software components, object-oriented software components, class components, and task components, processes, functions, attributes, procedures, subroutines, segments of program code, drivers, firmware, microcode, circuits, data, database, data structures, tables, arrays, and variables. Functions provided within the components and '~unit's may be combined into a smaller number of components and '~unit's or further separated into additional components and '~unit's. In addition, the components and '~unit's may be implemented to play one or more CPUs in the device or secure multimedia card.

The disclosure relates generally to a method of configuring a software defined network (SDN) in a data center or a telecommunication company.

In general, network devices each have a data plane and a control plane in a network. In addition, while the data plane and the control plane operate independently, the SDN is a network architecture that separates the data plane and the control plane of the network equipment.

The SDN may include an SDN controller for controlling a network and an SDN switch for processing communication data. The SDN switch is a component that processes communication data according to policies received from the SDN controller. Accordingly, the SDN switch has a relatively simple function, so that the unit cost and the cost of setting the device are often low. The SDN controller is a component for centrally controlling the SDN switch to collect the network status and efficiently control the network. In addition, the SDN has programmable network controls, making it easy to apply recent technologies or policies to the network.

In SDN, various protocols are used for the SDN switch control, and OpenFlow is generally used. OpenFlow is a protocol for defining an action of the SDN switch for a flow within the SDN. The SDN controller may install or delete a flow rule of the SDN switch using OpenFlow. The SDN switch may identify that the flow rule matches the data packet, and drop the packet or transmit it to the designated port according to the action defined in the flow rule. When the SDN switch does not have a flow rule that matches the data packet, the SDN switch may update the flow rule for the flow in the network by requesting the flow rule for the packet to the SDN controller.

In general, networks may use a virtual local area network (VLAN) for network virtualization. However, in the VLAN, the number of virtual networks is limited to 4096.

In order to address the above problem, a Virtual eXtensible Local Area Network (VXLAN) with extended VLANs was introduced. In VXLAN, communication may be achieved by configuring a tunnel between VTEPs using VTEP (VXLAN Tunnel End Point), which adds or removes VXLAN headers to data packets.

To use VXLAN in an OpenFlow network, the OpenFlow switch needs to support VTEP. However, there are switches that do not properly support the VTEP function when operating with OpenFlow. In general, to use VXLAN in the OpenFlow network, a separate device for VTEP or a specific switch supporting VTEP is used. Therefore, since specific equipment is required, the degree of freedom of network configuration is reduced and the problem of being dependent on VTEP equipment occurs.

The disclosure provides a method of performing VXLAN communication between a network using OpenFlow and a non-OpenFlow network in SDN by setting a VTEP of a general switch instead of a separate VTEP device.

FIG. 1 is a diagram illustrating a general OpenFlow based an SDN configuration method.

As shown in FIG. 1, in general, the SDN may include an SDN switch for data processing and an SDN controller for controlling the SDN switch. The SDN controller may centrally identify the state of the switch and control the switch. Although the SDN controller may use several protocols as a southbound interface to control the SDN switch, but OpenFlow may also be used. OpenFlow is a protocol designed for SDN and allows the SDN controller to control the flow processing of the SDN switch.

Figure 2:
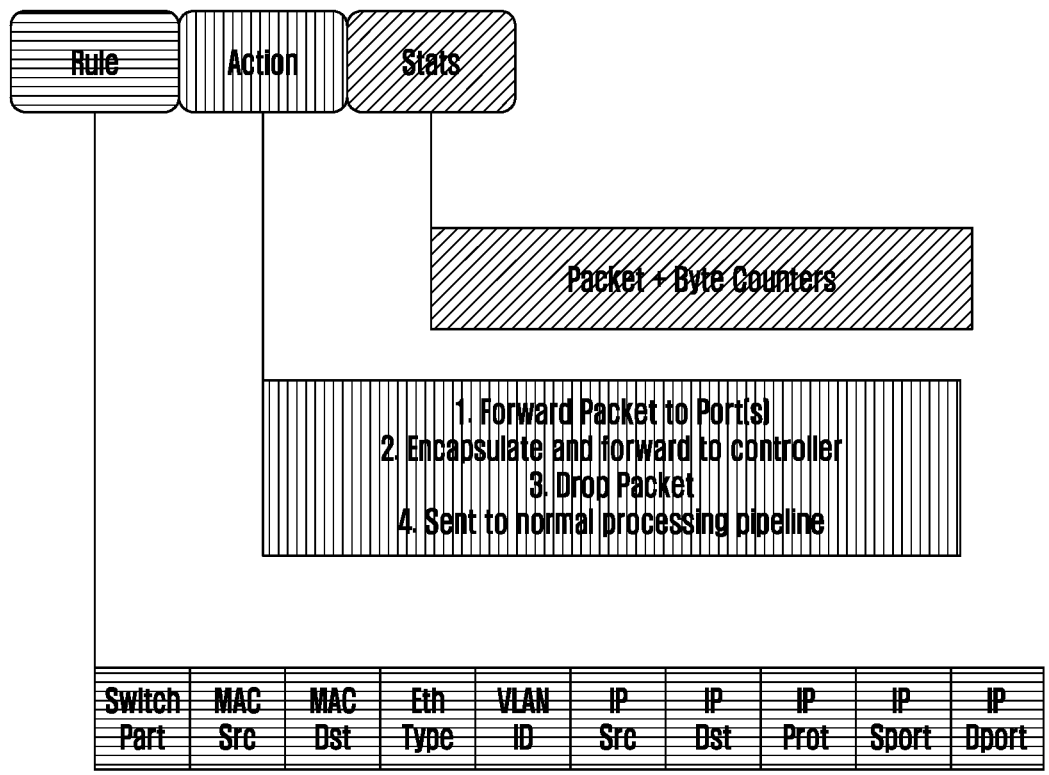
FIG. 2 is a diagram illustrating a flow table of a general OpenFlow switch.

FIG. 2 is a diagram illustrating a flow table of a general OpenFlow switch.

As shown in FIG. 2, a flow rule may be used in OpenFlow to process flow on a network. The flow rule may be configured with a match part for identifying whether a received data packet matches the flow rule, an action part defined in a method of processing the matched data packet, and a statistics part that has the statistical values for the flow. The OpenFlow switch may store the flow rule therein in the form of a table. The flow rule may be added, deleted, and modified by an SDN controller.

Figure 3:
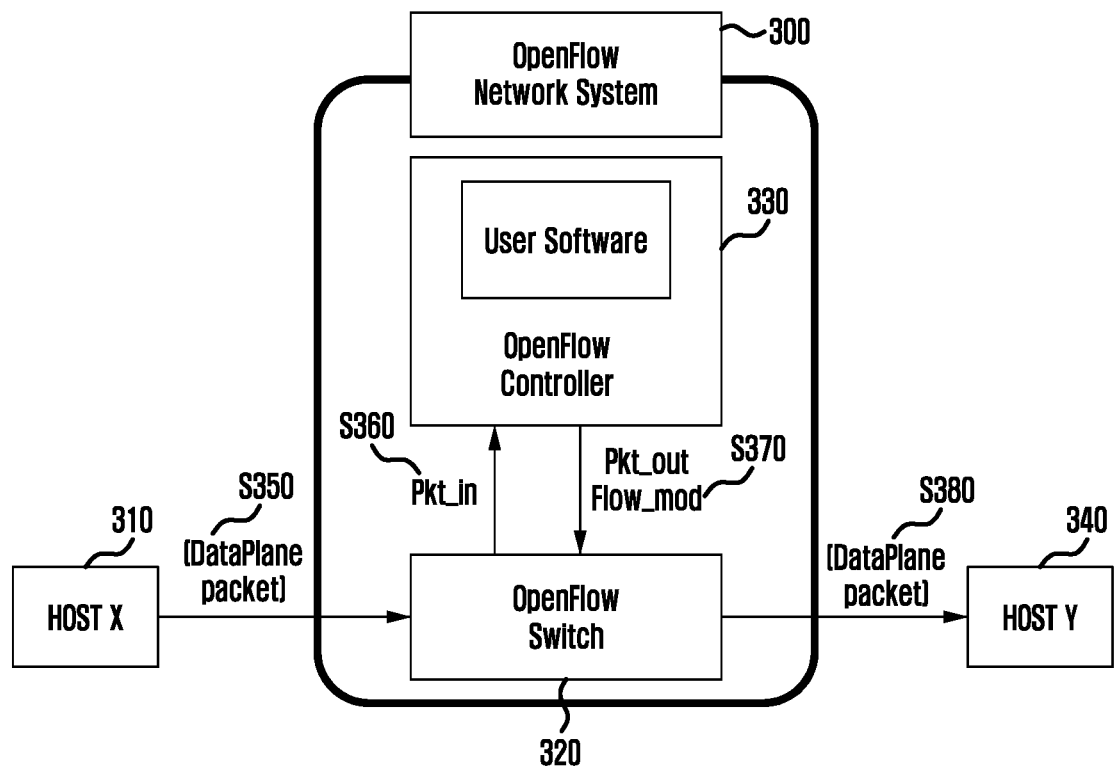
FIG. 3 is a diagram illustrating an example flow table update method for a new flow in an SDN according to various embodiments.

FIG. 3 is a diagram illustrating an example flow table update method for a new flow in an SDN according to various embodiments.

As shown in FIG. 3, communication packets not defined in the Flow table may reach the OpenFlow switch 320 of the OpenFlow network system 300 from any host (e.g., host X) (310). (S350) In this case, the OpenFlow switch 320 may transmit the corresponding packet to the SDN controller 330. (S360) In addition, the OpenFlow switch 320 may update a rule for a corresponding packet and operate according to the rule.

For example, the OpenFlow switch 320 may transmit a communication packet not defined in the Flow table to the SDN controller 330 by embedding it in a Packet_in (Pkt_in) message. The SDN controller 330 may set a flow table in the OpenFlow switch with a Flow_modification (Flow_mod) message by designating an operation for a packet included in the Packet_in.

In operation S370, the packet transmitted by the OpenFlow switch 320 to the SDN controller 330 by Pkt_in may be transmitted back to the OpenFlow switch 320 by Packet_out (Pkt_out).

In operation S380, the OpenFlow switch 320 may transmit a communication packet to another host (e.g., host Y) 340.

Figure 4:
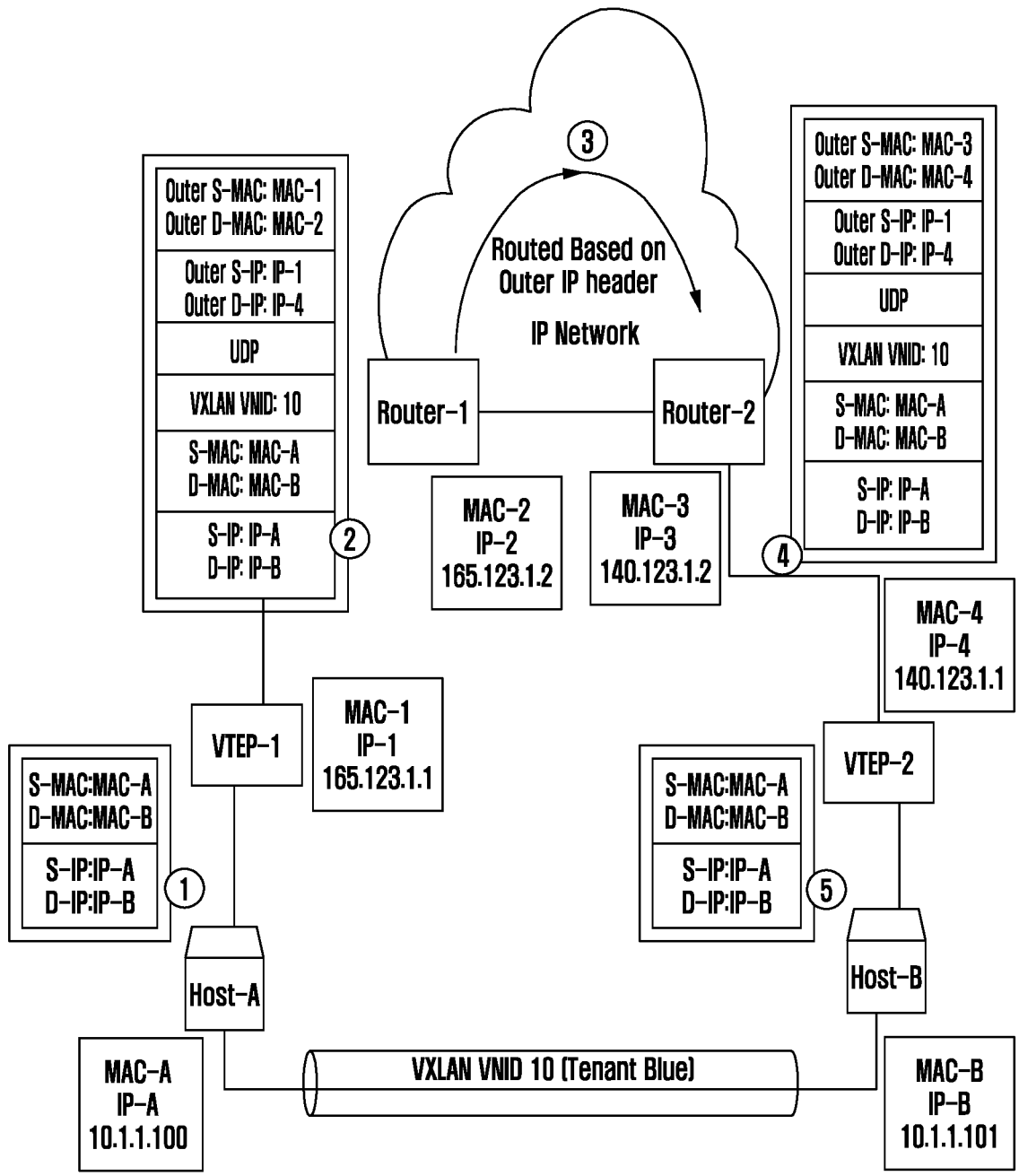
FIG. 4 is a diagram illustrating an example method of transmitting data through virtual eXtensible Local Area Network (VXLAN) communication according to various embodiments.

FIG. 4 is a diagram illustrating an example method of transmitting data through virtual eXtensible Local Area Network (VXLAN) communication according to various embodiments.

VXLAN is a technology that extends the existing VLAN L2 network. As described above, the VXLAN may overcome the limitation of the number of VLANs 4096. In VTEP, L2 data packets are encapsulated and transmitted to the counterpart VTEP based on IP/UDP, and the original L2 data packet is transmitted by decapsulation in the received VTEP.

In order to take advantage of VXLAN described above, there have been attempts to configure an overlay network and an underlay network using VXLAN in SDN. However, in VXLAN, communication is possible only when IP information is known between VTEPs, but in the case of OpenFlow switches, there is no separate protocol for exchanging information with other VTEPs. In the general method, a method of configuring a VXLAN tunnel by placing specific equipment in the OpenFlow network is used to exchange VTEP information between the OpenFlow network and the non-OpenFlow network and perform VTEP roles.

Figure 5:
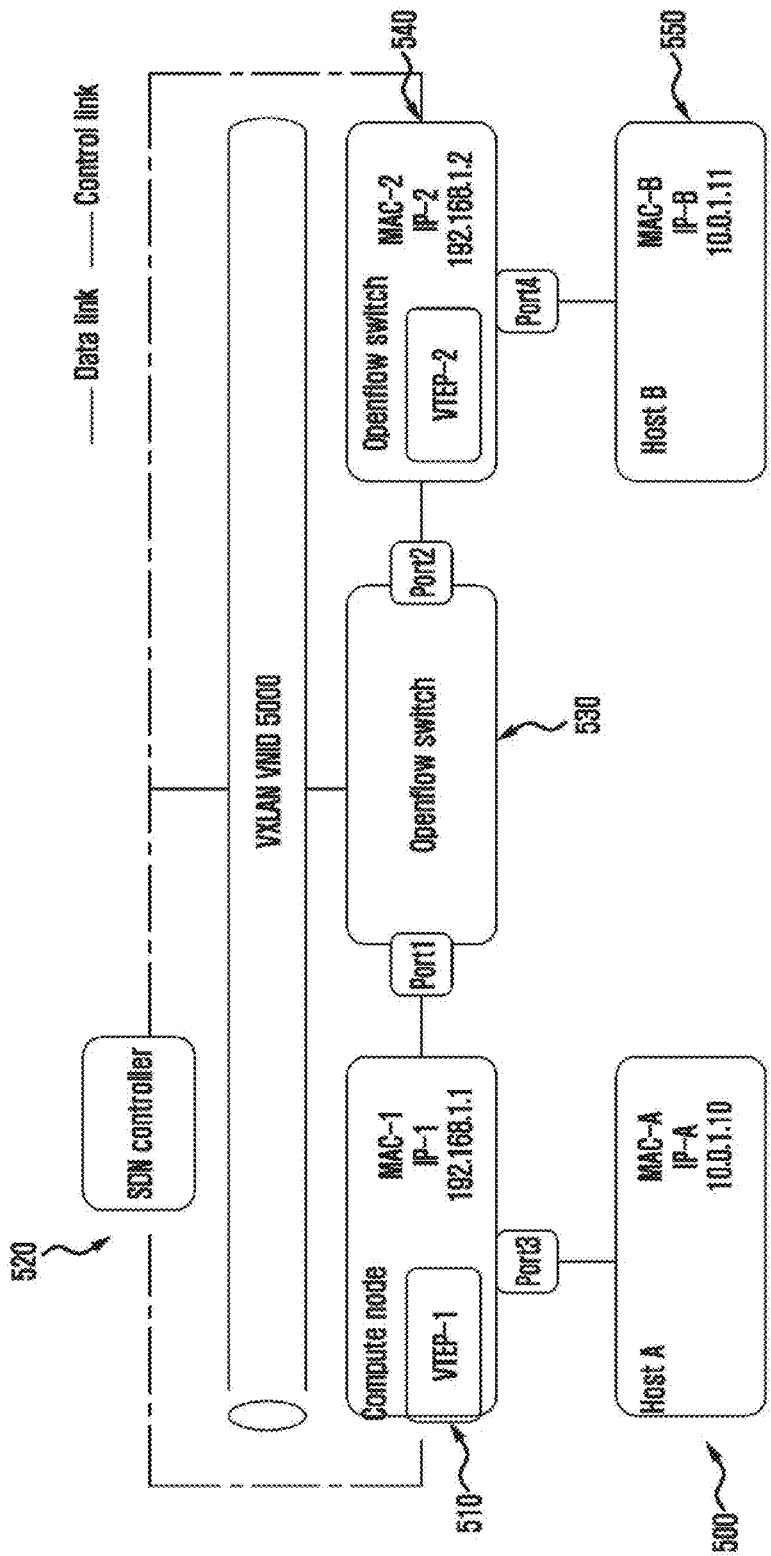
FIG. 5 is a diagram illustrating an example VXLAN communication method between a general OpenFlow network and a non-OpenFlow network according to various embodiments.

FIG. 5 is a diagram illustrating an example VXLAN communication method between a general OpenFlow network and a non-OpenFlow network according to various embodiments.

The host A 500 may transmit the data packet to a compute node 510. The computer node 510 receiving the data packet from the host A 500 may find a flow rule matching the received data packet. The computer node 510 may be a component in which an open virtual switch (OVS) is installed. Accordingly, the compute node 510 may perform the same operation as the OpenFlow switch.

After analyzing the data packet leaving the OpenFlow network, the compute node 510 may identify that the destination is the host B 550 that exists in VTEP-2. In this case, the compute node 510 may add a VXLAN header based on the identified host B 550. For example, the SDN controller 520 may receive a request that the destination is VTEP-2 for the VXLAN packet and transmit the destination flow rule for the VXLAN outer header to the OpenFlow switch 530. The OpenFlow switch 530 may execute a destination flow rule. The OpenFlow switch 540 may strip the received VXLAN packet and transmit only the original IP header and the Ethernet payload to the destination port. For example, the OpenFlow switch 540 may transmit the original IP header and the ethernet payload to the host B 550.

The VXLAN communication method as described above has a problem in that the selection of device is limited because a specific device capable of supporting VTEP is used for the OpenFlow device.

Accordingly, it is possible to address a problem caused by the dependence of specific equipment on a network (OpenFlow network) including OpenFlow switches in an SDN environment. For example, the disclosure may configure a network to enable VXLAN communication regardless of a switch type or a switch vendor.

According to an embodiment, an SDN environment is considered, and the SDN may include an SDN controller, several SDN switches, and a host.

The SDN switch may be classified according to a protocol in which the SDN controller controls the SDN switch. In the disclosure, an SDN switch configured with OpenFlow may, for example, be referred to as an OpenFlow switch, and other available SDN switches are referred to as non-OpenFlow (Non-OF) switches. The OpenFlow switch and the non-OpenFlow switch, for example, the SDN switch is connected to the SDN controller through a control link and may transmit or receive packets.

The SDN controller may install, delete, and modify flow rules in each OpenFlow switch in the OpenFlow network. In addition, the SDN controller may be able to process data packets through installation, deletion, and modification of the flow rule. In a non-OpenFlow network, a method of the operation may be different depending on the protocol used by the SDN controller to control the non-OpenFlow switch, in general, the operation of the switch may be controlled by adding, deleting, and modifying the settings of the switch.

The SDN controller may identify port information of the SDN switch and identify the link state between the SDN switches based on the connection state of the port.

Figure 6:
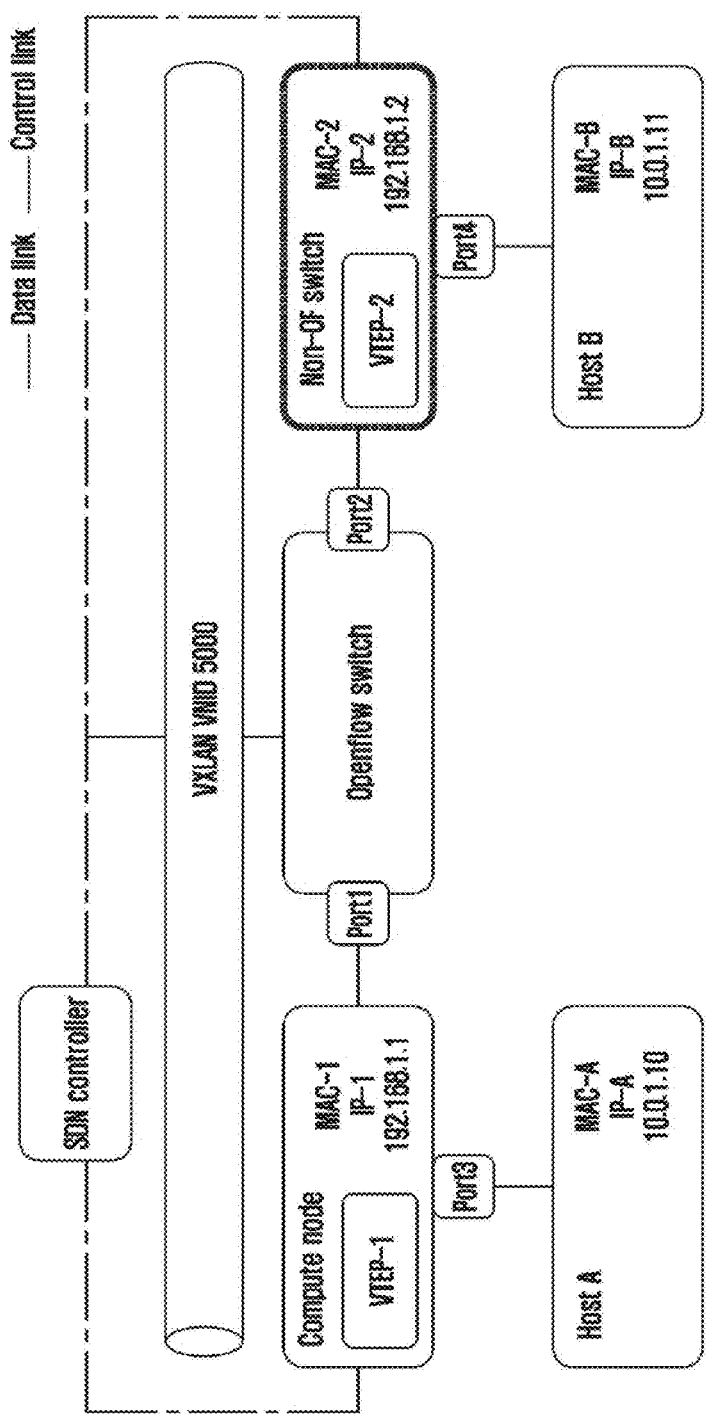
FIG. 6 is a diagram illustrating an example VXLAN communication method according to various embodiments.

Hereinafter, according to the disclosure, a method of performing VXLAN communication between an OpenFlow network and a non-OpenFlow network by configuring a network as a disclosed method as shown in FIG. 6 will be described in greater detail below.

FIG. 6 is a diagram illustrating an example VXLAN communication method according to various embodiments. As shown in FIG. 6, according to the present disclosure, it may further include a non-OpenFlow switch as well as an SDN switch configured as OpenFlow in an SDN environment.

Hereinafter, an example communication method in the SDN environment of the disclosure will be described in greater detail.

Figure 7:
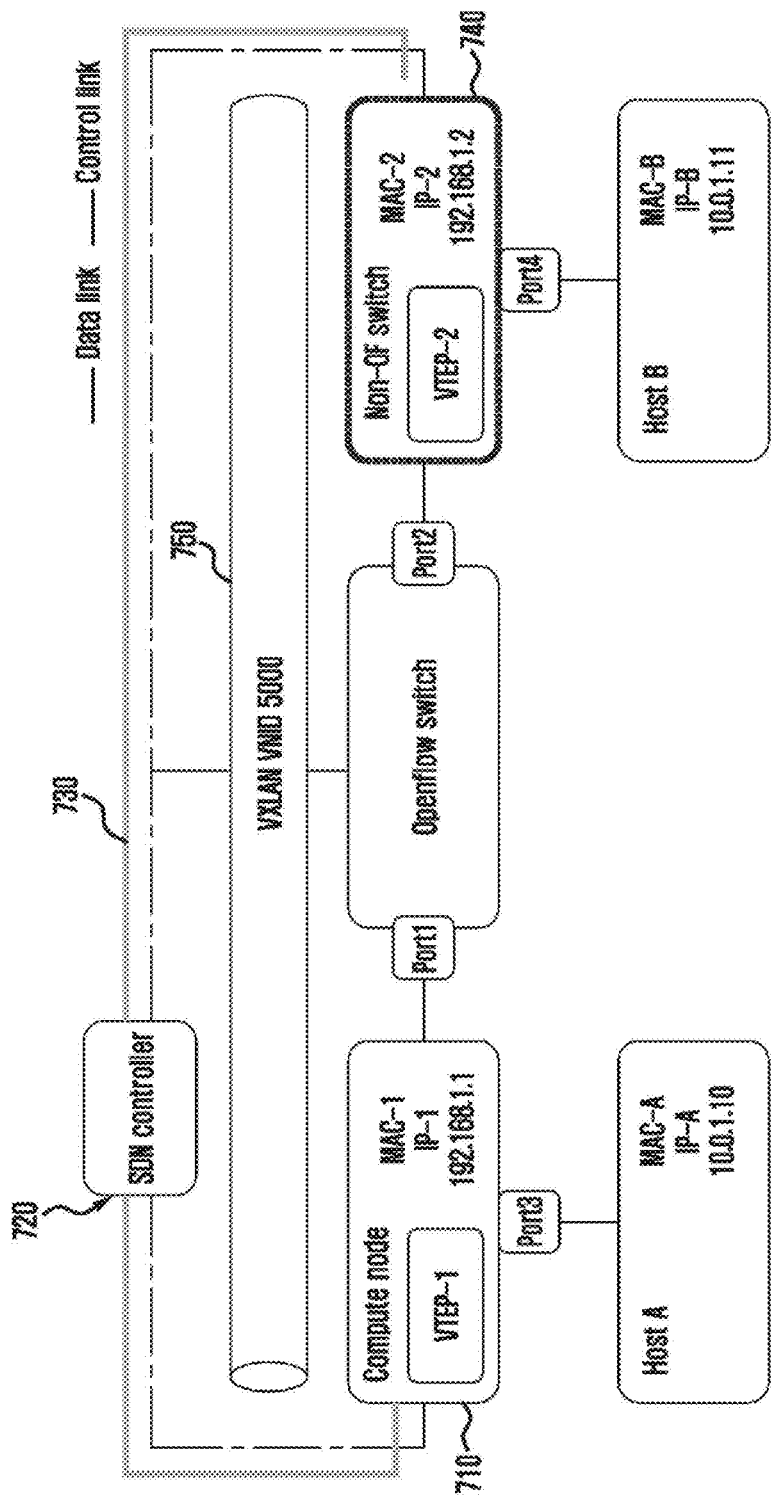
FIG. 7 is a diagram illustrating an example method of setting a VXLAN Tunnel End Point (VTEP) for VXLAN communication according to various embodiments.

FIG. 7 is a diagram illustrating an example method of setting a VXLAN Tunnel End Point (VTEP) for VXLAN communication according to various embodiments.

The equipment (e.g., computer node) 710 supporting OpenFlow generates a session with the SDN controller 720 and the control link 730.

The SDN controller 720 may set a flow rule for setting VTEP-1 by transmitting information to be used as VTEP to the computer node 710 through the control link 730.

The non-OpenFlow switch 740 and the SDN controller 720 may be connected to each other through the control link 730. The SDN controller 720 may control the non-OpenFlow switch 740 through the control link 730.

For example, the SDN controller 720 may set VTEP-2 by transmitting VTEP setting commands to the non-OpenFlow switch 740 through the control link 730.

When the setting of VTEP-1 and VTEP-2 is completed, a tunnel 750 may be created between VTEP-1 and VTEP-2 with the VNID designated by the SDN controller 720.

Figure 8:
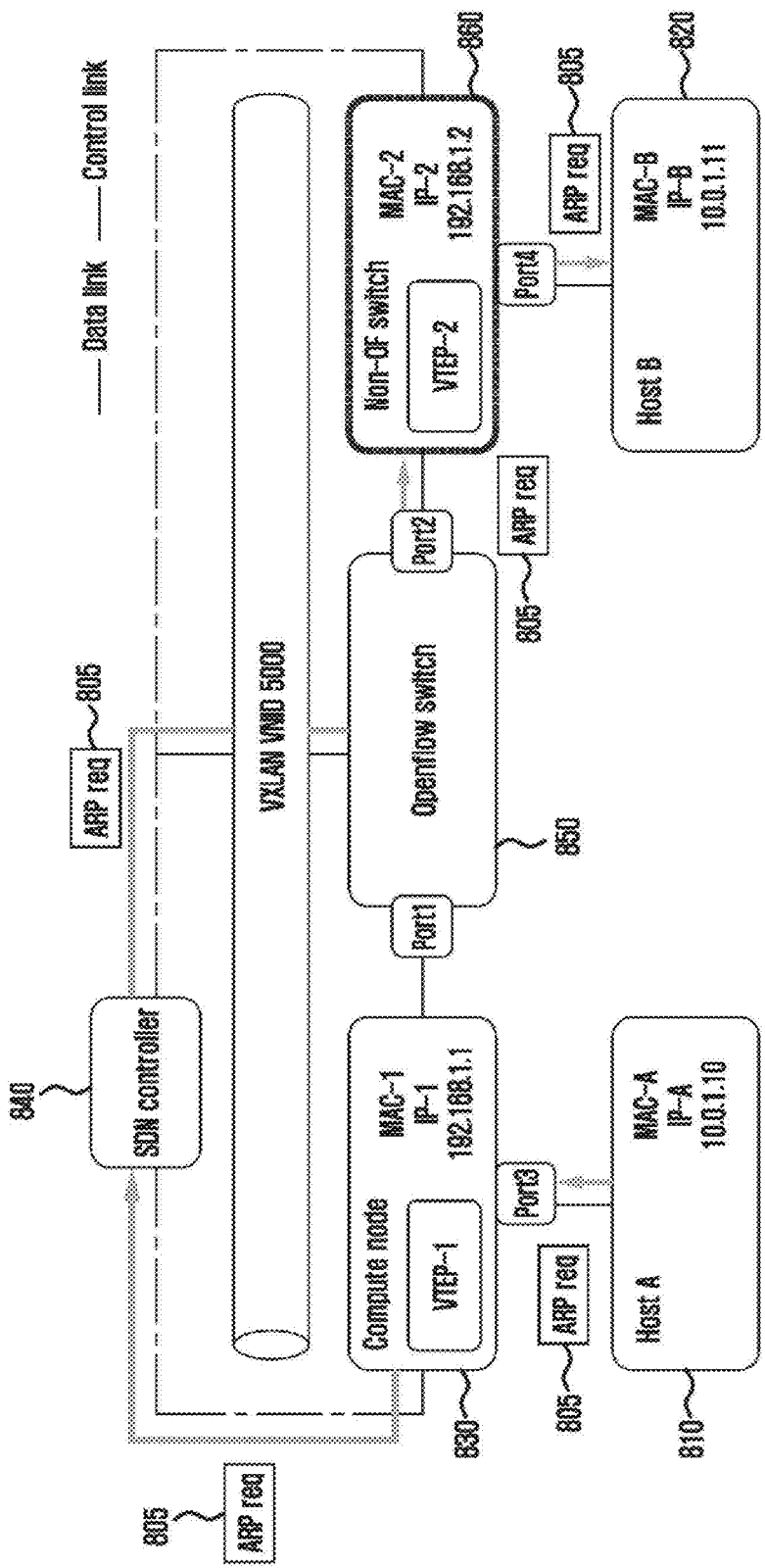
FIG. 8 is a diagram illustrating an example method of transmitting a method for an address resolution protocol (ARP) request for verifying MAC information of a host B according to various embodiments.

FIG. 8 is a diagram illustrating an example method of transmitting a method for an address resolution protocol (ARP) request for verifying MAC information of a host B according to various embodiments. For example, a non-OpenFlow switch may learn a MAC address according to an embodiment disclosed in FIG. 8 to be described in greater detail below.

In order to know the MAC address of host B 820 from host A 810, an ARP request 805 may be transmitted to the IP address of host B 820.

The flow rule may be identified in the compute node 830 receiving the ARP request 805. And the compute node 830 may packet-in the ARP request 805 to the SDN controller 840.

The SDN controller 840 may identify the MAC address and IP of the host A 810 in the network through the received ARP request 805 and identify whether the SDN controller 840 has information 820. Without information on the host B 820, the SDN controller 840 may set a flow rule for transmitting an ARP request 805 (connected to non-OpenFlow switch 860) to the non-OpenFlow switch 860 to the OpenFlow switch 850 outside the OpenFlow network.

When the SDN controller 840 has the information of the host B 820, the ARP reply may be generated with the information of the host B 820. In addition, the SDN controller 840 may set a flow rule for transmitting the ARP reply to the host A 810 at the compute node 830 and then transmit the ARP reply to the compute node 830 as a packet-out.

As described above, the SDN controller 840 may transmit the ARP request 805 received from the compute node 830 to the external OpenFlow switch 850 by packet-out.

The OpenFlow switch 850 may transmit the ARP request 805 to the non-OpenFlow switch 860 by a flow rule designated by the SDN controller 840.

The non-OpenFlow switch 860 may learn the MAC address of the host A 810 by the received ARP request 805.

The non-OpenFlow switch 860 may flood the ARP request 805 and transmit it to the host B 820. The host B 820 may learn the MAC address and IP of the host A 810 based on the ARP request 805.

Figure 9:
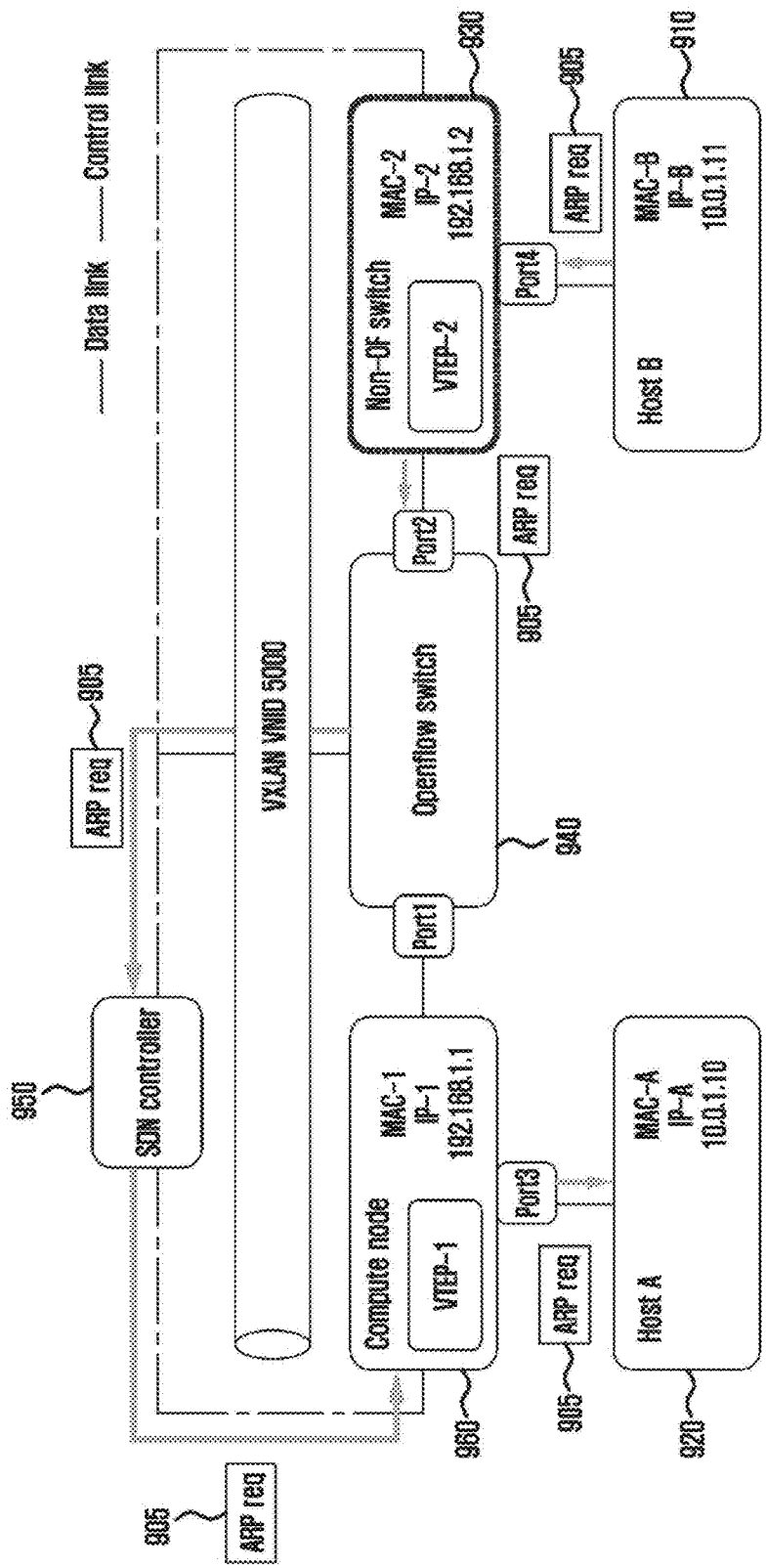
FIG. 9 is a diagram illustrating an example method of transmitting an ARP reply from host B to host A according to various embodiments.

FIG. 9 is a diagram illustrating an example method of transmitting an ARP reply from host B to host A according to various embodiments.

The host B 910 may transmit the ARP reply 905 in response to the ARP request 905 from the host A 920.

The non-OpenFlow switch 930 receiving the ARP reply 905 from the host B 910 may learn the MAC information of the host B 910 from the information in the ARP reply 905.

The non-OpenFlow switch 930 transmits the ARP reply 905 to the external OpenFlow switch 940 as host B 910 information learned by the ARP reply 905.

In addition, the OpenFlow switch 940 may identify the flow rule for the received ARP reply 905 and transmit the ARP reply 905 to the SDN controller 950 by packet-in.

The SDN controller 950 may learn the information of the host B 910 connected to the non-OpenFlow switch 930 by the received ARP reply 905. Additionally, the SDN controller 950 may transmit the ARP reply 905 to the compute node 960 having a link with the host A 920 by a packet-out.

The compute node 960 may transmit the received ARP reply 905 to the host A 920 according to the flow rule. The host A 920 may learn the MAC address of the host B 910 by receiving the ARP reply 905.

Figure 10:
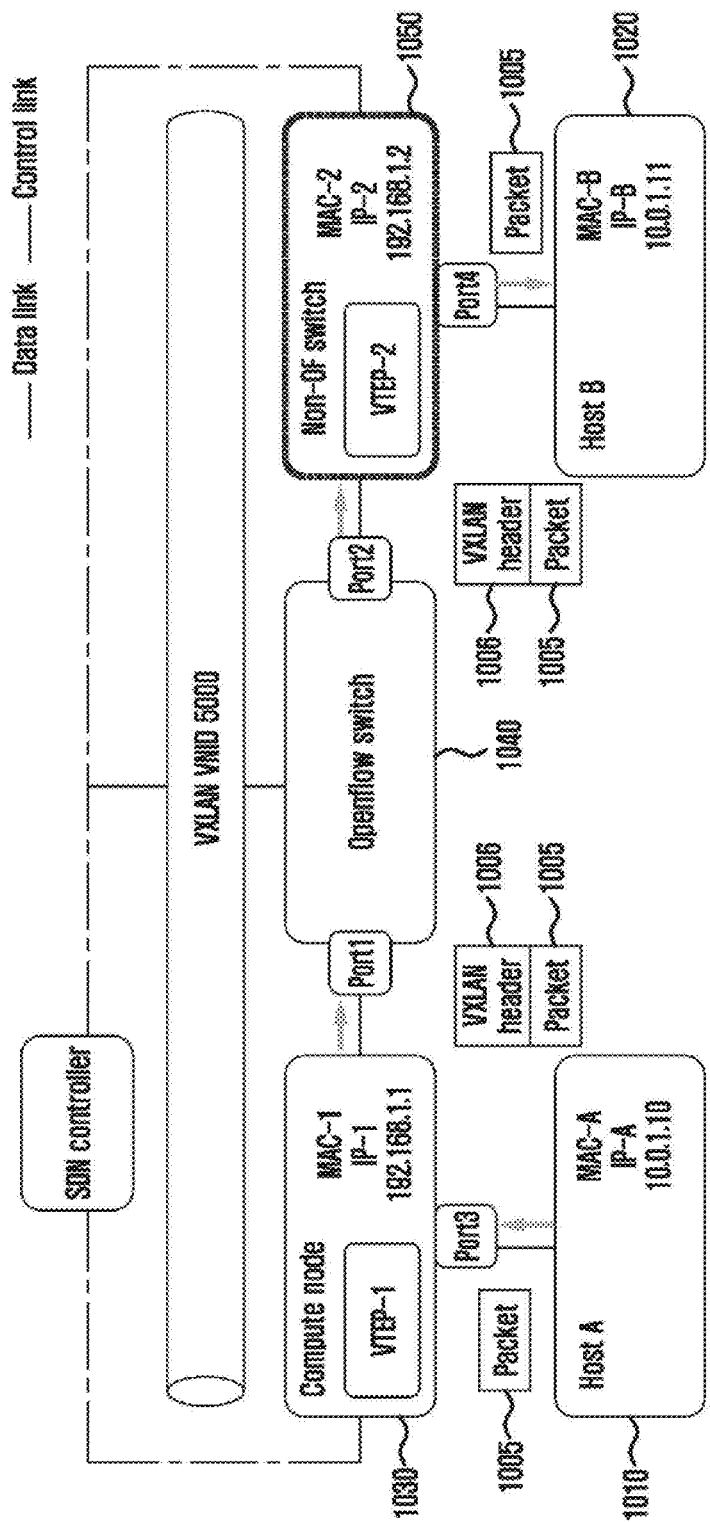
FIG. 10 is a diagram illustrating an example VXLAN communication method according to various embodiments.

FIG. 10 is a diagram illustrating an example VXLAN communication method according to various embodiments.

The host A 1010 may transmit a data packet to the host B 1020 using MAC information of the host B 1020 previously learned through the ARP. To this end, the host A 1010 may transmit the data packet 1005 to the compute node 1030. The computer node 1030 receiving the data packet 1005 may identify the flow rule. In addition, the compute node 1030 may add a VXLAN header 1006 as VTEP-2 information to transmit the data packet 1005 to host B 1020, in VTEP-1.

The compute node 1030 may transmit the data packet 1005 to which the VXLAN header 1006 is added to the OpenFlow switch 1040 outside the OpenFlow network according to the flow rule.

The external OpenFlow switch 1040 receiving the data packet 1005 adding the VXLAN header 1006 may transmit the data packet 1005 adding the VXLAN header 1006 to the port connected to the non-OpenFlow switch 1050 according to the flow rule.

The non-OpenFlow switch 1050 may identify whether the destination information of the data packet 1005 to which the received VXLAN header 1006 is added is its own VTEP-2. As a result of identifying, when the destination information of the data packet 1005 to which the VXLAN header 1006 is added is VTEP-2 of the non-OpenFlow switch 1050, the non-OpenFlow switch 1050 may remove the VXLAN header.

The non-OpenFlow switch 1050 may select a port to transmit the data packet 1005 using the MAC information of host B 1020 from the original data packet 1005 from which the VXLAN header 1006 is removed. The non-OpenFlow switch 1050 may select a port to transmit the data packet 1005. Additionally, the non-OpenFlow switch 1050 may transmit the data packet 1005 to the selected port. Based on the above method, the host B 1020 may receive the data packet 1005 from the host A 1010.

Figure 11:
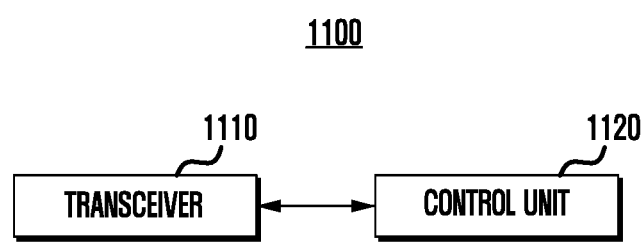
FIG. 11 is a block diagram illustrating an example configuration of a control unit according to various embodiments.

FIG. 11 is a block diagram illustrating an example configuration of a controller 1100 according to various embodiments. The controller 1100 may be an SDN controller 1100. In addition, the controller 1100 may form a link with equipment supporting OpenFlow and an OpenFlow/non-OpenFlow switch, and may transmit/receive information and data.

The controller 1100 may include a transceiver 1110 and a control unit (e.g., including processing and/or control circuitry) 1120. In the disclosure, the control unit 1120 may include, for example, a circuit or an application-specific integrated circuit or at least one processor.

The transceiver 1110 is a component for transmitting and receiving information and data with the other device.

The control unit 1120 may include various circuitry and generally control the controller 1100. For example, when a request message requesting the MAC address of the second device is received from the first device, the control unit 1120 may identify the MAC address and IP of the first device and identify whether information of the second device is stored. In this case, when the information of the second device is stored, the control unit 1120 may transmit the stored information of the second device to the first device. On the other hand, when the information of the second device is not stored, the control unit 1120 may set the flow rule for transmitting the request message to the non-OpenFlow switch, in the OpenFlow switch.

Figure 12:
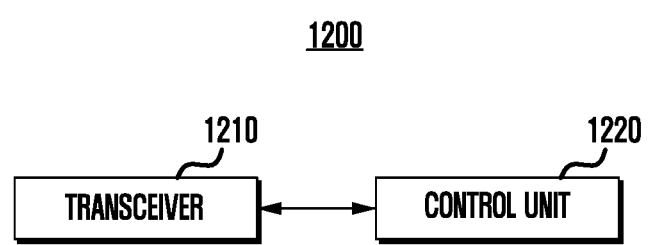
FIG. 12 is a block diagram illustrating an example configuration of a switch according to various embodiments.

FIG. 12 is a block diagram illustrating an example configuration of a switch 1200 according to various embodiments. According to the disclosure, the switch 1200 may be a non-OpenFlow switch.

The switch 1200 may include a transceiver 1210 and a control unit (e.g., including processing circuitry and/or control circuitry) 1220. In the disclosure, the control unit 1220 may include a circuit or application-specific integrated circuit or at least one processor.

The transceiver 1110 is a component for transmitting and receiving information and data with the other device.

The control unit 1220 may include various circuitry and generally control the switch 1200. For example, when a data packet is received through a node that forms a link with the first device, the control unit 1220 may transmit the data packet to the second device forming a node with the switch 1200.

The switch 1200 may receive the data packet from the node through another switch. The other switch may be an OpenFlow switch.

Communication may be performed using general equipment (e.g., a switch) instead of dedicated equipment through a network system, as described above, including the controller 1100 and the switch 1200.

According to the disclosure, a network may be configured to enable VXLAN communication regardless of a switch type and a vendor.

A program code for performing a network system and a control method thereof according to various embodiments described above may be stored in a non-transitory computer readable medium. The non-transitory computer readable medium refers to a medium that stores data semi-permanently and can be read by a device. For example, the above-described various applications or programs may be stored and provided in the non-transitory computer readable medium such as a CD, a DVD, a hard disk, a Blu-ray disk, a USB, a memory card, a ROM, and the like.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. A method performed by a software defined network (SDN) controller in a wireless communication system, comprising:
    transmitting, to a network node connected to a first host device, setting information for configuring the network node as a first virtual extend local area network (VXLAN) tunnel end point (VTEP);
    transmitting, to a switch connected to a second host device, command information for configuring the switch as a second VTEP,
    wherein a tunnel using a virtual network identifier (VNID) for VXLAN is generated between the first VTEP and the second VTEP,
    wherein the network node is configured to add a header to a data packet received from the first host device and transmit a processed data packet including the header through the tunnel, and
    wherein the switch is configured to
    receive the processed data packet through the tunnel and remove the header to
    transmit the data packet to the second host device.

2. The method according to claim 1,
    wherein the header comprises a VXLAN header,
    wherein a value of the VNID for VXLAN is greater than a 4096, and
    wherein the network node supports OpenFlow and the switch does not support OpenFlow.

3. The method according to claim 1, further comprising:
receiving, from the network node, a request message requesting address information of the second host device from the first host device;
determining whether the address information of the second host device is stored based on information on the first host device;
in accordance with a determination that the address information of the second host device is not stored, transmitting, the request message to an OpenFlow switch connected to the switch, and
in accordance with a determination that the address information of the second host device is stored, transmitting, to the network node, a response message corresponding to the request message.

4. The method according to claim 3, further comprising:
in accordance with a determination that the address information of the second host device is not stored, controlling the OpenFlow switch by setting a specified flow rule to the OpenFlow switch.

5. A software defined network (SDN) controller in a wireless communication system, comprising:
at least one processor comprising processing circuitry; and
at least one transceiver comprising communication circuitry,
wherein the at least one processor is configured to:
transmit, to a network node connected to a first host device through the at least one transceiver, setting information for configuring the network node as a first virtual extend local area network (VXLAN) tunnel end point (VTEP);
transmit, to a switch connected to a second host device through the at least one transceiver, command information for configuring the switch as a second VTEP,
wherein a tunnel using a virtual network identifier (VNID) for VXLAN is generated between the first VTEP and the second VTEP,
wherein the network node is configured to add a header to a data packet received from the first host device and to transmit a processed data packet including the header thorough the tunnel, and
wherein the switch is configured to: receive the processed data packet through the tunnel and remove the header to transmit the data packet to the second host device.

6. The SDN controller of claim 5,
wherein the header comprises a VXLAN header,
wherein a value of the VNID for VXLAN is greater than a 4096, and
wherein the network node supports OpenFlow and the switch does not support OpenFlow.

7. The SDN controller of claim 5, wherein the at least one processor is further configured to:
receive, from the network node, a request message requesting address information of the second host device from the first host device;
determine whether the address information of the second host device is stored based on information on the first host device;
in accordance with a determination that the address information of the second host device is not stored, transmit the request message to an OpenFlow switch connected to the switch; and
in accordance with a determination that the address information of the second host device is stored, transmit, to the network node, a response message corresponding to the request message.

8. The SDN controller of claim 7,
wherein the at least one processor is further configured to, in accordance with a determination that the address information of the second host device is not stored, control the OpenFlow switch by setting a specified flow rule to the OpenFlow switch.

* * * * *